US011797589B2

(12) United States Patent
Thungala (10) Patent No.: US 11,797,589 B2
(45) Date of Patent: Oct. 24, 2023

(54) REDUCING OVERCOLLECTION OF UNSTRUCTURED DATA

(71) Applicant: PayPal, Inc., San Jose, CA (US)

(72) Inventor: Rupa Devi Thungala, Chennai (IN)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/528,758

(22) Filed: Nov. 17, 2021

(65) Prior Publication Data

US 2023/0153339 A1    May 18, 2023

(51) Int. Cl.
 *G06F 16/335*    (2019.01)
(52) U.S. Cl.
 CPC .................. *G06F 16/335* (2019.01)
(58) Field of Classification Search
 CPC .................................. G06F 16/335
 See application file for complete search history.

(56) References Cited

U.S. PATENT DOCUMENTS

| 2006/0051064 | A1* | 3/2006 | Bray | G11B 27/034 |
| | | | | 386/E9.036 |
| 2009/0152357 | A1* | 6/2009 | Lei | G06F 16/93 |
| | | | | 235/454 |
| 2015/0341370 | A1* | 11/2015 | Khan | H04L 63/20 |
| | | | | 726/30 |
| 2017/0048170 | A1* | 2/2017 | Smullen | H04L 67/61 |
| 2019/0377901 | A1* | 12/2019 | Balzer | G06F 21/6254 |

OTHER PUBLICATIONS

Byun, J.W., Bertino, E., Li, N.: Purpose based access control of complex data for privacy protection. In: Proceedings of the Tenth ACM Symposium on Access Control Models and Technologies, pp. 102-110. ACM. (Year: 2005).*

* cited by examiner

*Primary Examiner* — Kannan Shanmugasundaram
(74) *Attorney, Agent, or Firm* — HAYNES AND BOONE, LLP (57) ABSTRACT

Systems and methods for reducing overcollection of unstructured data are disclosed. In an embodiment, a computer system may access an image uploaded by a user through a user interface for a function provided by a service provider. The computer system may identify items of information that are contained in the image. The computer system may determine necessary items of information in the image based on the function. The computer system may mask unnecessary items of information in the image. The computer system may present a masked image to the user through the user interface, where the masked image removes the unnecessary items of information contained in the image and shows the necessary items of information to perform the function.

20 Claims, 6 Drawing Sheets

Verification 204

Please verify information and submit.

Jane Doe
DOB: 1/2/1979

402
405

- [ ] Name
- [ ] Date of Birth
- [ ] I hereby provide consent

Submit 404

REDUCING OVERCOLLECTION OF UNSTRUCTURED DATA

TECHNICAL FIELD

The present disclosure generally relates to data structures and management and more particularly to reducing overcollection of unstructured data according to various embodiments of the present disclosure.

BACKGROUND

Organizations oftentimes need to collect and store a large volume of data for their customers. The data collected sometimes is in the form of unstructured data which does not allow for simple rules to be implemented to align with data privacy and computer security policies. For example, unstructured data such as images, videos, text conversations, voice conversations, and so forth with customers may contain sensitive content that is not easily recognizable by computers. Simply storing such unstructured data poses security risks to internal or external computer breaches where the unstructured data can be misused by bad actors. Such data breaches generally result in heavy regulatory fines, loss of customer trust, and use of computing resources to remedy or address the data breach. Therefore, there exists a need in the art for techniques to reduce overcollection of unstructured data.

BRIEF DESCRIPTION OF THE FIGURES

FIG. 4 illustrates an example masked image presentation screen for a user interface in accordance with one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Securing sensitive customer information is critical in ensuring compliance and protecting against data breaches. Data breaches worldwide expose millions of people's sensitive data each year. Consequently, data protection has become a top priority of many organizations. Personally identifiable information (PII) and payment card industry (PCI) data are particular types of sensitive data that are the focus of most organizations' security efforts. Protecting sensitive information such as social security numbers and payment card accounts is especially important for organizations that are responsible for clients' data, such as large retail, banking, healthcare, and software-as-a-service (SaaS) companies. Generally, sensitive content may include types of information the person or the organization does not want unintended recipients to have or have access to, such as bank account number, personal identification number (PIN), security code for bank cards (e.g., CCV), international bank account number (IBAN), credit card number, debit card number, biometric information such as weight and height, residential address (e.g., city, country, postal code, street, state, zip code), criminal status, date of birth, account numbers, device identifiers, education information, email address, gender identity, gender, geolocation, income, IP address, internet service provider, MAC address, marital status, military status (e.g., veteran), employer, name (e.g., family, full, given), national origin, phone number, political affiliation, race, ethnicity, religion, health, social media account handles, sexual orientation, social security number, etc.

Oftentimes, organizations may need to collect and store a large volume of data where the data is in an unstructured data format. For example, when customers or clients use communication channels to communicate with the organization, such as through email, online chat, electronic file or document upload, conversational logs, mobile applications, contact centers, social media, and so forth, the customer or client may provide PII or PCI data without noticing or otherwise understanding the risks.

With such large volumes of data, it is increasingly difficult to analyze the received data and take actions to align with data privacy and computer security policies, especially when the data is in an unstructured data format such as when image or audio files are uploaded by users. Unstructured data frequently contains data that is unnecessary for the purpose for which the unstructured data was collected. For example, where a user is required to upload a form of identification such as an official government identification card, the uploaded image of the identification card will contain more than is needed to verify the identity of the user. For example, a passport number or date that the passport expires may be unnecessary items of information that were contained in an image upload of a passport for the organization to store in order to appropriately verify the user's identity. Storing unnecessary personal information only increases the risk and exposure to computer security breaches.

Therefore, the present disclosure describes systems and methods for reducing overcollection of unstructured data contained in electronic files, such as for data privacy and computer security purposes.

In one example embodiment, a computer system for an electronic service provider may be employed to execute a function related to an electronic service provided by the electronic service provider. For example, the function may be an identity verification of a user. The user may upload an electronic file (e.g., an image file or audio file) which may be temporarily cached and/or directly streamed to avoid saving any unnecessary PII in the electronic file to a database. The computer system may identify items of information that are contained in the electronic file using data classification. For example, the computer system may pre-process the electronic file and classify the electronic file for PII using a multi-label machine learning classifier trained to classify for the PII. In some embodiments in which the electronic file is an image file, the data classification may include performing optical character recognition on the image file to detect areas of image noise that may correspond to PII text.

The computer system may determine which items of information are necessary to perform the function. The computer system may determine which items of information are necessary to perform the function based on predefined rules associated with the function. As one example, where the function is a type of identity verification, a predefined rule may indicate that only a full name and date of birth from the electronic file are necessary to perform the identity verification. Once the computer system has determined which items of information are necessary, the computer system may analyze the electronic file to determine which of the identified items of information match the necessary items of information. Any of the identified items of information contained in the electronic file that do not match the necessary items of information may be considered unnecessary items of information contained in the electronic file.

The computer system may mask the unnecessary items of information in the electronic file. In an embodiment, to perform the masking, the computer system may null or alter the unnecessary items of information contained in the electronic file. For example, where the electronic file is an image file, the computer system may change pixel values corresponding to boundaries of unnecessary information to non-uniform or uniform null/arbitrary values. As another example, where the electronic file is an audio file, the computer system may change the audio segments corresponding to unnecessary items of information to noisy (e.g., uninterpretable) or muted audio sections in the audio file.

The computer system may present the masked electronic file to the user through a user interface so that the user is made aware of items of information that will be protected (e.g., masked) and how the uploaded electronic file has been masked for storage by the electronic service provider. The computer system may send a request to the user device for consent to store the masked electronic file and necessary items of information. After reviewing the masked electronic file, the user may send a consent response to the computer system, which will indicate to the computer system whether the user consents to the storage of the masked electronic file. Upon the computer system receiving the user's consent, the computer system may store the masked electronic file.

Further details and additional embodiments are described below in reference to the accompanying figures.

Figure 1:
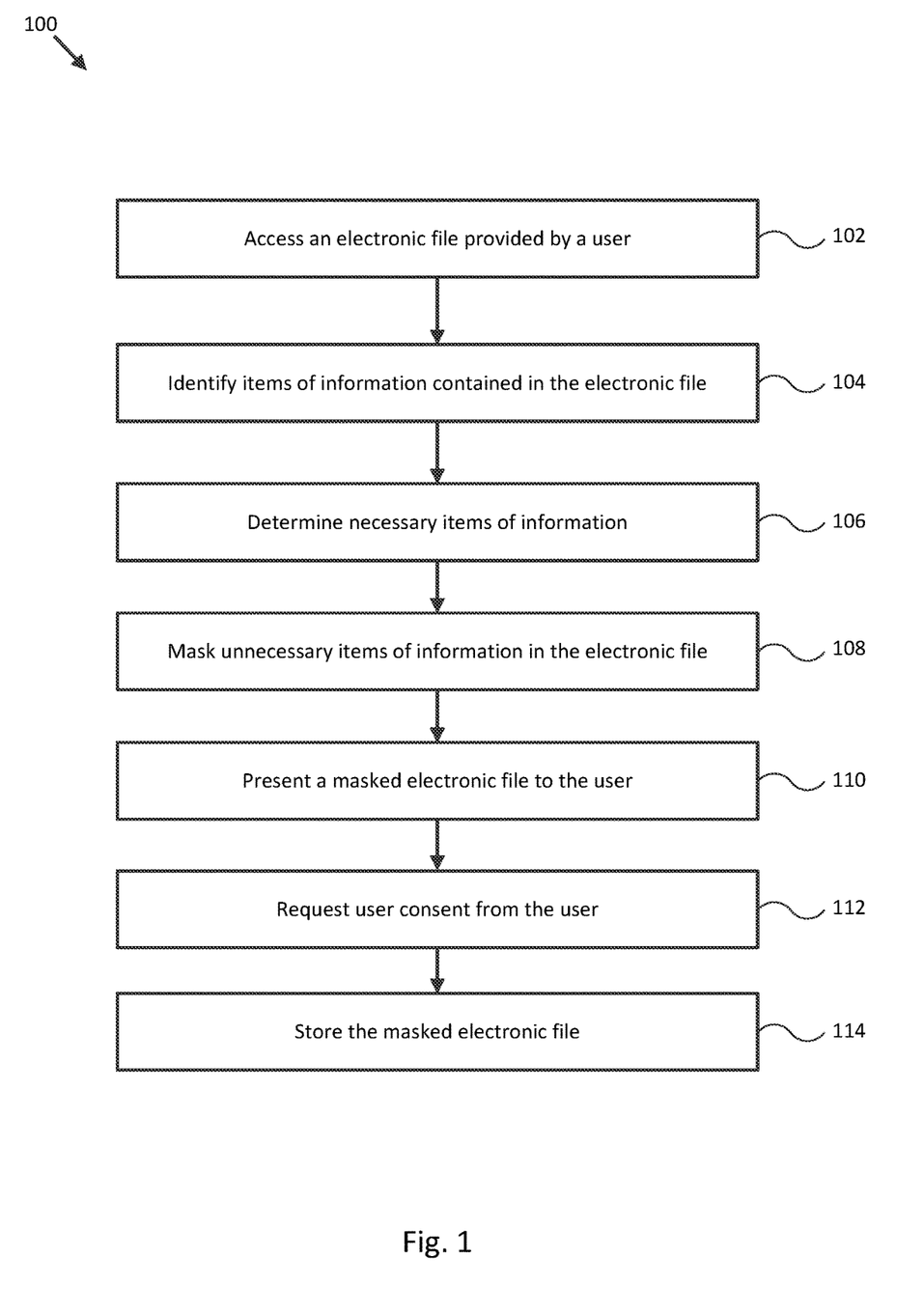
FIG. 1 illustrates a flow diagram of a process for reducing overcollection of unstructured data in accordance with one or more embodiments of the present disclosure.

Referring now to FIG. 1, illustrated is a flow diagram of a process 100 for reducing overcollection of unstructured data in accordance with one or more embodiments of the present disclosure. The blocks of process 100 are described herein as occurring in serial, or linearly (e.g., one after another). However, multiple blocks of process 100 may occur in parallel. In addition, the blocks of process 100 need not be performed in the order shown and/or one or more of the blocks of process 100 need not be performed. For explanatory purposes, process 100 is primarily described herein with reference to FIGS. 2-4.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

In some embodiments, the process 100 may be performed by a computer system having at least a non-transitory memory (e.g., a machine-readable medium) and one or more hardware processors configured to read instructions from the non-transitory memory to cause the system to perform the process 100. For example, the computer system may include one or more computer systems 600 of FIG. 6.

At block 102, the computer system may access an electronic file provided by a user. The electronic file may be an image file (e.g., PDF, JPEG, PNG, GIF, RAW, TIFF, etc.), audio file (e.g., M4A, FLAC, MP3, MP4, WAV, WMA, AAC, etc.), or other type of file format that would be considered unstructured data. Unstructured data may be information that either does not have a predefined data model or is not organized in a predefined manner. By contrast, structured data may be highly organized and easily understood by machine language. Although the electronic file is primarily referred to herein as an image, it will be understood that the process 100 may generally be applied to other file formats such as audio files and other unstructured data file formats.

Figure 2:
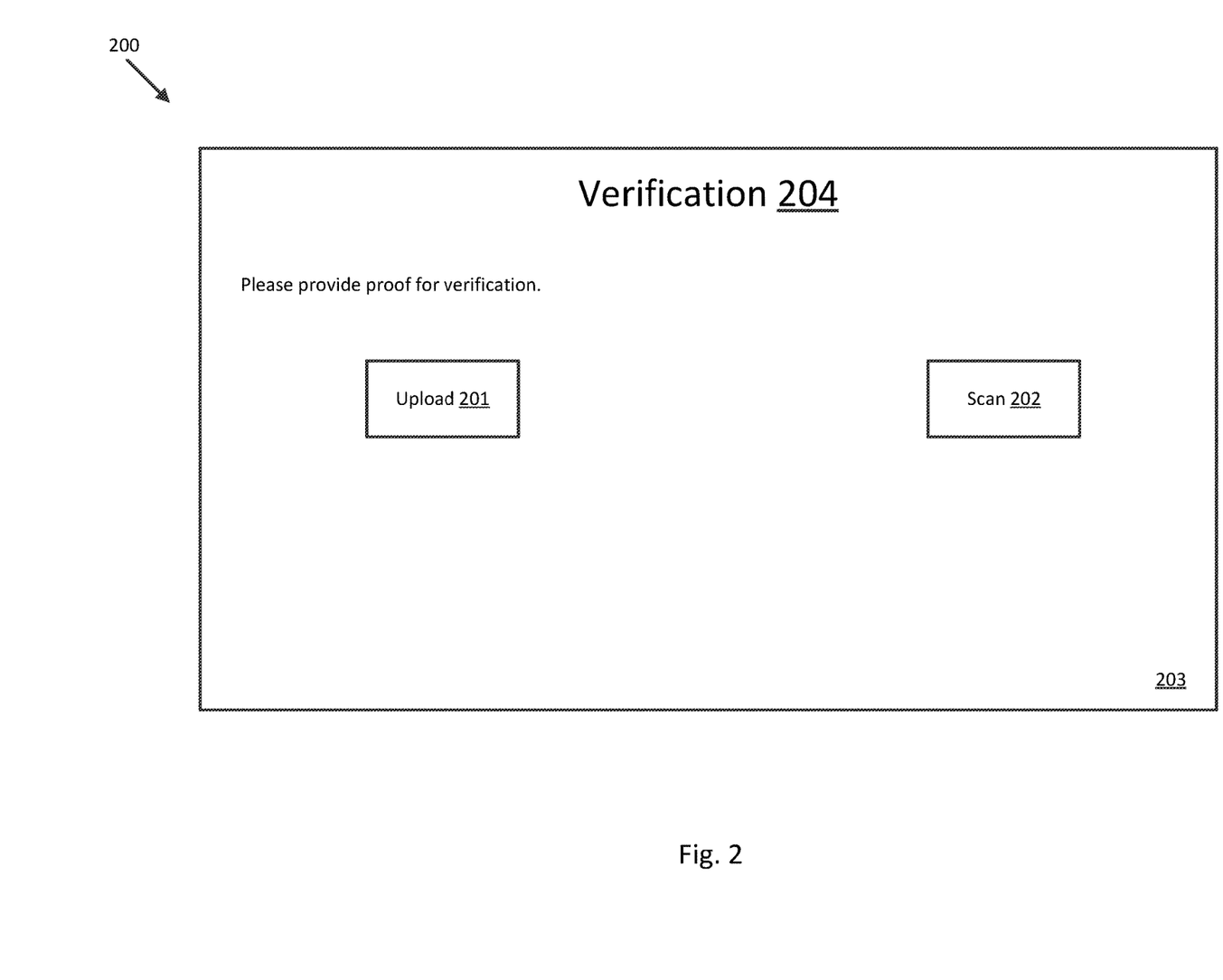
FIG. 2 illustrates an example verification screen for a user interface in accordance with one or more embodiments of the present disclosure.

As shown in FIG. 2, for a verification 204, the user may be presented with a user interface 200, such as in a user device associated with the user. The user interface 200 may include a screen 203 that includes a selectable option to upload 201 an image as proof for the verification 204 The user interface 200 may further include a selectable option to scan 202 an image, where the computer system may send instructions to the user device (e.g., via a network connection) in an active session between the computer system and the user device to cause the user device to access a camera of the user device and scan (e.g., image capture) the image for upload to and reception by the computer system for the verification 204. In some embodiments, when the image has been uploaded to and received by the computer system, the computer system may temporarily cache the image to perform the masking operations further discussed herein.

The verification 204 may be for one or more functions according to various embodiments of the present disclosure. In an embodiment, the user interface 200 may correspond to a verification step for a function for an electronic service provider that manages the computer system. For example, the verification 204 may be required by the computer system to verify an identity of the user in order to proceed with an electronic service provided by the electronic service provider.

As an example, the verification 204 of the identity of the user may be for a function of completing a registration of a service account for the user, in which the electronic service provider may require personal information about the user to verify the user. In some cases, the user may be provided with options for how to be verified, such as the option of uploading an image of one or more official forms of identification (e.g., an official government identifier, driver's license, passport, etc.).

As another example, the function may be for authenticating the user prior to executing an electronic service or process. In one embodiment, the electronic service may be an electronic transaction service such as a peer-to-peer electronic transaction, account deposit/withdrawal or electronic asset transfer, in which a verification 204 may be required as a security step to authenticate the user before the electronic transaction service can be processed. In yet another example, the function may be a document verification in which the user uploads an image of a document to verify that information provided by the user has been correctly and accurately provided.

Figure 3:
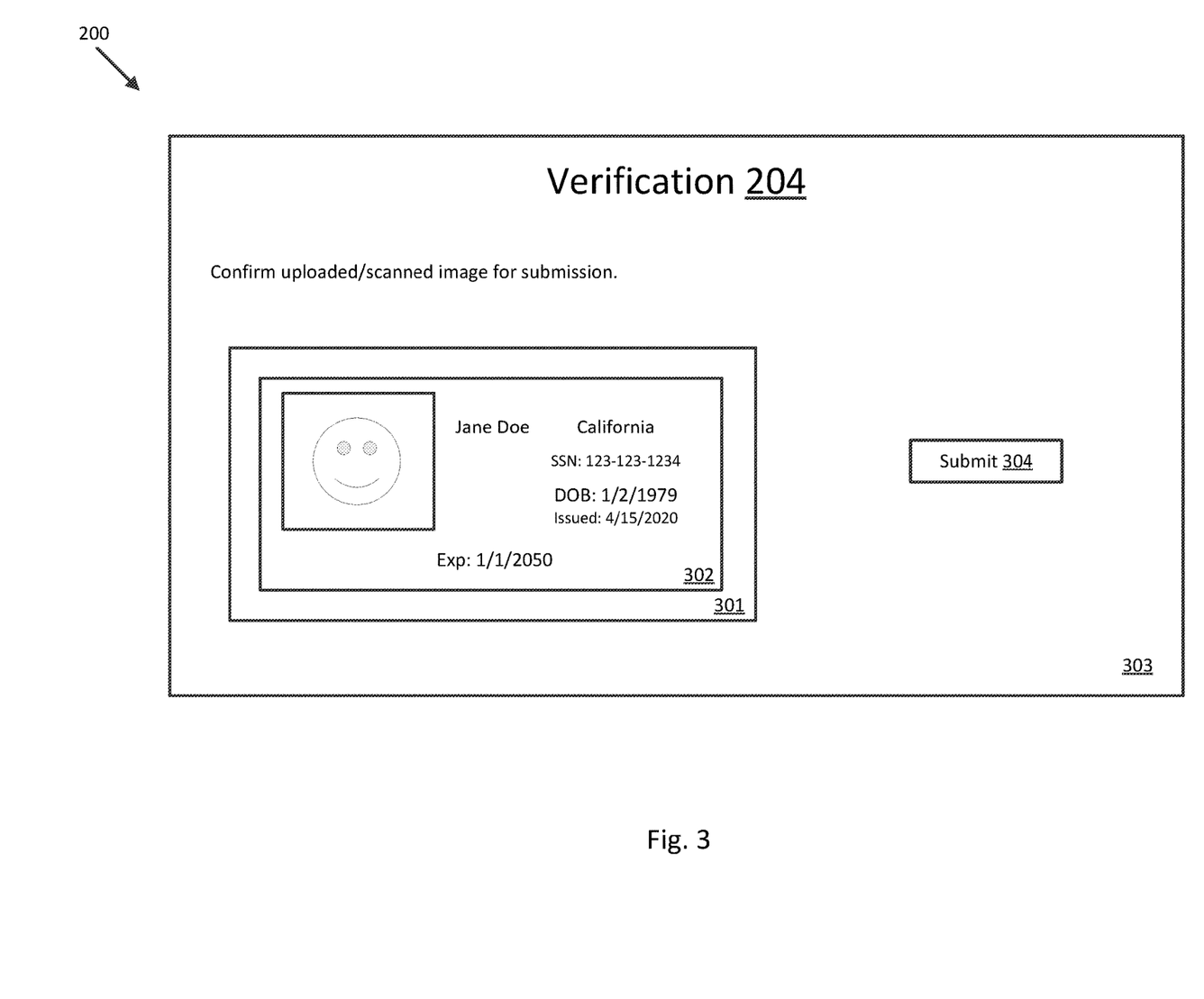
FIG. 3 illustrates an example confirmation screen for a user interface in accordance with one or more embodiments of the present disclosure.

As shown in FIG. 3, the user may have selected the image 302 for upload to the computer system or may have scanned the image 302 using a camera on the user device associated with the user. In the example shown in FIG. 3, the image 302 may be a driver's license that includes the user's picture, first and last name, state of residence, social security number (e.g., SSN), date of birth (e.g., DOB), date of issuance for the driver's license, and expiration date for the driver's license. The computer system may send instructions to the user device to cause the user device to display the image 302 in a window 301 of a screen 303 of the user interface 200, prior to submission, so that the user may confirm that the image 302 is correct and that the user would like to submit 304 the image 302 for the verification 204.

Once the user has confirmed that the image 302 is correct and in condition for submission for the verification 204, the user may select to submit 304 the image 302 to the computer system. The user device may then send the image 302 to the computer system over the network connection in the active session and the computer system may receive the image 302. Instead of storing the image 302 permanently in a database, the computer system 302 may temporarily cache the image 302 in a cache memory associated with the computer system to perform the masking operations further discussed below. The image 302 may be disposed/deleted by the computer system after performing the masking operations so as to not store any unnecessary items of information that could be contained in the image 302. Various encryption and decryption techniques may be implemented for transmission of the image 302 at block 102 of the process 100.

Referring back to FIG. 1, at block 104, the computer system may identify items of information contained in the image. The computer system may identify items of information that correspond to personally identifiable information (PII) data for example. In some embodiments, the computer system may be implemented with a data classification machine learning model to identify the information contained in the image. The classification model may be a multi-label classification model trained to identify any items of information related to the user that can be used to distinguish or trace the user's identity, such as name, social security number, date and place of birth, mother's maiden name, or biometric records, and/or other information that is linked or linkable to the user, such as medical, educational, financial, and employment information.

Further examples of information that may be identified from the image may include home address, email address, passport number, driver's license number, credit card numbers, telephone number, owned properties (e.g., vehicle identification number), account login details, processor or device serial number, media access control (MAC), Internet Protocol (IP) address, device identifiers (IDs), cookies, gender, race, age, job position, and any other item of information that the electronic service provider, or other operator, may specify as personally identifiable information or otherwise sensitive.

According to various embodiments, the data classification at block 104 may implement image processing and text/image localization and extraction. For example, the computer system may auto-orient the received image from the user device to adjust the image into a correct orientation to perform data classification. The computer system may further prepare the image for data classification using image normalization (e.g., changing the range of pixel intensity values to a range that will facilitate the data classification). In some embodiments, the computer system may perform optical character recognition (OCR) to detect areas in the image that correspond to text. In some embodiments, the computer system may perform contour detection over the image to detect boundaries (e.g., outlines, borders) of each item of information in the image. The boundaries may correspond to x-y pixel coordinates that form separate boundaries that encompass each of the items of information contained in the image.

In some embodiments, where the electronic file is an audio file, the computer system may implement various speech recognition and/or natural language processing techniques to identify items of information in the audio file. The audio file may be segmented into time stamps where the items of information are provided, and the segmented time stamps may be labeled by a machine learning model data classifier trained to identify different items of information based on audio file inputs. Similarly, in further embodiments, where the electronic file is a video file, the computer system may implement one or more image processing algorithms to scan through the frames of the video file and identify items of information contained in one or more of the frames similar to how a single image would be processed.

In further embodiments, where the electronic file is in an unstructured text file format, the computer system may process the text using natural language processing techniques to identify items of information based on grammatical structure of sentences, user input exchanges, words, and derived context.

At block 106, the computer system may determine necessary items of information in the image based on the function for the verification 204. For example, as discussed above, a function may be an identity verification, such as to complete a registration of a user account for the user or to authenticate the user prior to performing an electronic transaction. Various other functions beyond those previously discussed herein are also contemplated, including auto-populating account details such as for account registration/setup, auto-populating transaction details such as name and billing/shipping address, authentication prior to changing account settings/information, and so forth.

To determine the necessary items of information in the image, the computer system may determine rules that apply for the function. For example, a rule may be predefined for a corresponding function and indicate which items of information are necessary to perform the function. For example, the electronic service provider may establish rules for each function where the rules dictate what items of information are necessary to complete the function. As an illustration, in an embodiment where the function is an identity verification, the computer system may determine that a predefined rule for the identity verification requires that the user provide a first name and last name as well as a date of birth on an official ID card to be verified. Thus, in such a case, the user may have provided the image 302 shown in FIG. 3, which may be a driver's license.

The rules for each function may be updated from time to time to suit a desired application. In some cases, rules for a function may be different based on a region or geolocation from which the user causes the performance of the function. For example, an identity verification function performed for a user located in Europe may have different rules for the function than if the user was located in the United States. In other words, the rules for functions may be localized to the jurisdiction in which the user is located, and in some cases may be tailored based on local regulations. For example, the identity verification for a user located in the United States may have necessary items of information of a full name, date of birth, and headshot picture whereas the identity verification for a different user located in Europe, for example, may only have necessary items of information of a headshot picture and last name to perform the same identity verification.

At block 108, the computer system may mask unnecessary items of information in the image. The unnecessary items of information may be items of information that were identified to be contained in the image 302 but do not have labels, provided by the classification performed at block 104, that correspond to the necessary items of information for the function. In other words, the computer system may determine which of the identified items of information in the image 302 have labels that match the labels of the one or more necessary items of information for the function, where any of the identified items of information that do not have a label that matches the one or more necessary items of information are considered unnecessary items of information.

As shown in FIG. 4, the image 402 has unnecessary items of information masked (e.g., blacked out) for the verification 204. In comparison to the image 302 of FIG. 3, the image 402 of FIG. 4 has the following unnecessary items of information masked: the user's picture, state of residence, SSN, date of issuance for the driver's license, and expiration date for the driver's license. The first and last name and DOB may be left unmasked as these items of information may be required for the particular identify verification 204 for a specific function. As discussed above, it will be appreciated that FIGS. 3 and 4 are provided for non-limiting illustrative purposes. Various other functions, including various other functions that require identify verification, may have different necessary items of information for performance of the function than those shown in FIGS. 3 and 4.

In some embodiments, masking the unnecessary items of information may include removing/obfuscating the unnecessary items or otherwise nulling the unnecessary items from the image such that the unnecessary items cannot be identified or reverse engineered. In one embodiment, masking the unnecessary items of information may include nulling the unnecessary items of information by substituting data corresponding to the unnecessary items of information with null values. For example, the computer system may place a bounding box using x-y pixel coordinates of the unnecessary items in the image 402, determined at block 104, and fill the bounding box with predefined pixel values. For example, pixel values corresponding to a dark fill may be used to replace the data of the unnecessary items of information. According to various embodiments, the pixel values may be non-uniform (e.g., blurred) or uniform intensities (e.g., solid dark) to mask the unnecessary items of information in the image.

In embodiments where the electronic file is an audio file, rather than an image as discussed above, the computer system may mask audio segments of the audio file that contain the unnecessary items of information. For example, the computer system may determine bounding boxes for the audio segments in the audio file that contain the unnecessary items of information at block 104, and mute said audio segments or apply an otherwise null value (e.g., replace with an indistinguishable uniform or non-uniform sound frequency) to said audio segments so that the audio segments cannot be deciphered or reverse engineered.

Where the electronic file is a video file, individual frames of the video may be masked in a similar fashion to how individual images are masked. In this regard, the frames of the video file may be converted to individual images for masking purposes. In various embodiments, the masking of data may be permanent such that the masked data cannot be recovered. However, in other embodiments, the masking of data may be performed in a non-permanent fashion such that the masked data may be recovered.

Referring back to FIG. 1, at block 110, the computer system may present the masked image to the user. For example, as shown in FIG. 4, the computer system may send instructions to the user device to cause the user device to display a screen 403 in the user interface 200, in which a window 405 may present the masked image 402 to the user for review. The masked image 402 may be presented to the user as it would be stored by the electronic service provider if the user provides consent, although in some embodiments, the masked image may be stored differently but still having the unnecessary items of information unreadable.

At block 112, the computer system may send a request for user consent to the user device to store the masked image 402 in a database. For example, the computer system may instruct the user device to display, on screen 403 of the user interface 200, a user consent form 401. The user consent form 401 may include fillable fields for the user to select/fill the necessary items of information that were identified in the image 302 and provide consent to the electronic service provider to store the necessary items of information in the masked image 402 in a database associated with the electronic service provider.

Thus, the computer system may provide a transparent user experience for the user, whereby the user is made aware of items of information that would be protected (e.g., masked) and/or how the uploaded image by the user appears when masked for storage by the electronic service provider. After reviewing the masked image 402 and selecting/inputting the fields corresponding to the necessary items of information in the user consent form 401, the user may submit 404 a user consent response. The user device may then send the response to the computer system, which will indicate to the computer system whether the user consents to the storage of the masked image 402, including the necessary items of information contained in the masked image 402.

In embodiments where the electronic file is an audio file rather than an image as discussed above, the computer system may provide the masked audio file to the user device for playback at the user device and review by the user similar to the embodiments discussed above related to masked images. The user may play the masked audio file to hear that certain segments of audio containing unnecessary items of information have been masked. Similar to above, the user may provide a user consent response for storage of the masked audio file.

In some embodiments, the time to respond to the user consent request may be limited. For example, to protect the user's data, the masked image 402 may be deleted from any temporary storage associated with the computer system if the time limit for response to the request for user consent lapses. In various embodiments, the user consent form 401 may include a timer that counts down a time for a user to respond before the masked image 402 is removed from the user interface 200 and deleted to protect the user's data. Thus, in situations where the user device has timed out or otherwise disconnected from the session with the computer system, the computer system will delete the masked image 402 to protect the user's privacy and data.

At block 114, the computer system may store the masked image 402. For example, the computer system may store the masked image 402 in a database associated with the electronic service provider along with a relational mapping to a user account registered to the user and for which the electronic service provider provides electronic services. For example, the user account may have a key corresponding to an index in a customer table which may be used to look up data stored and mapped to the key.

In some embodiments, the stored masked image 402 may further be protected when stored in the database by implementing firewalls, data encryption (e.g., AES, SHA, RSA), and physical access controls to data centers where the masked image 402 is stored. In an embodiment, an encryption algorithm may be used to encrypt the electronic file with an encryption key to generate encoded information (e.g., ciphertext), which may be decoded using a decryption key generated either at the time of encryption or beforehand. In some embodiments, symmetric encryption may be used by the computer system to encrypt the electronic file. However, in other embodiments asymmetric encryption may be used by the computer system to encrypt the electronic file.

Therefore, the present disclosure provides security against data breaches by limiting the collection of unstructured data to only data that is necessary for various functions. Furthermore, the present disclosure makes the data protection processes implemented by an electronic service provider more transparent, which consequently may lead to greater trust by users in using the electronic service provider's services.

Figure 5:
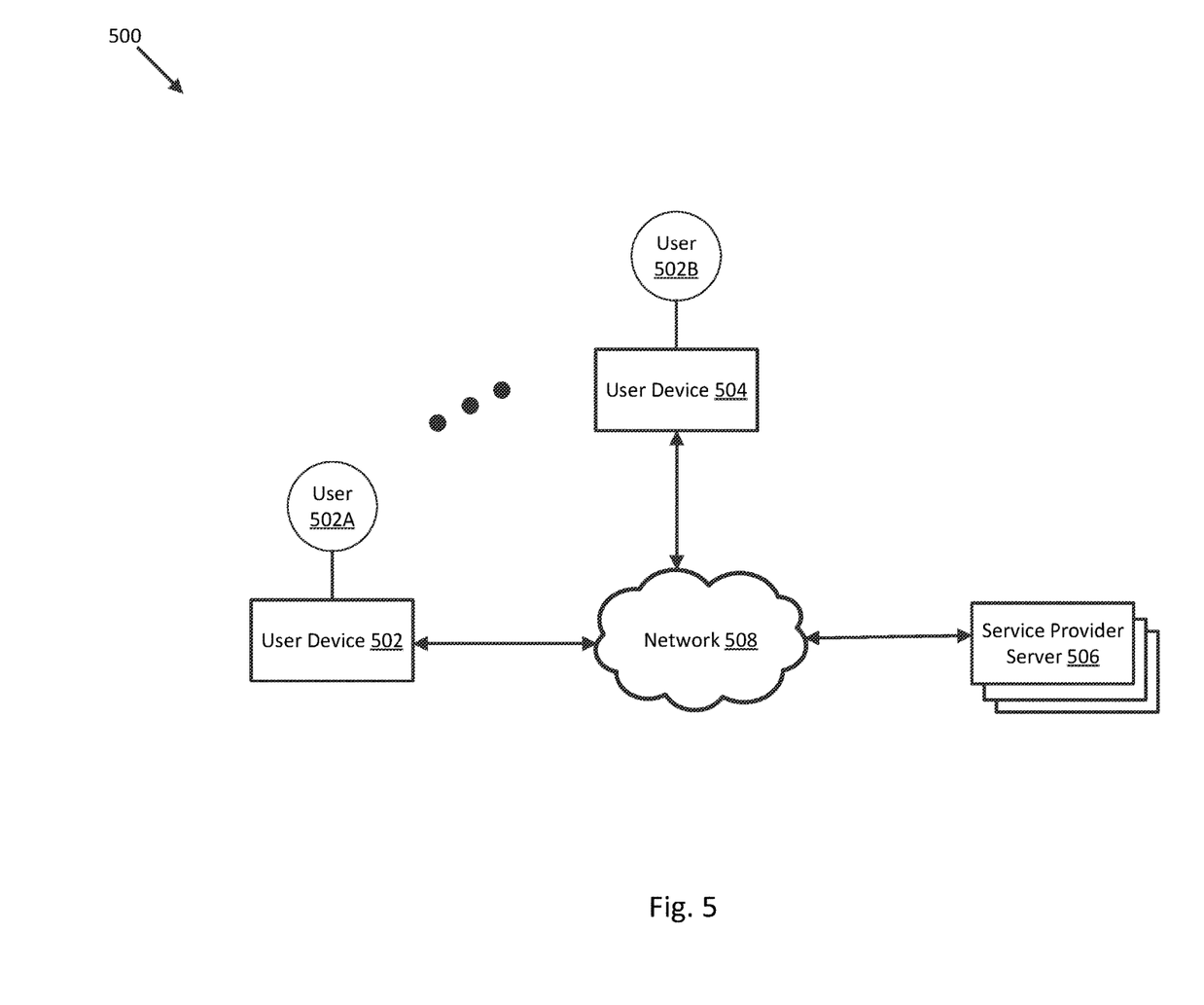
FIG. 5 illustrates a block diagram of a networked system suitable for implementing one or more embodiments of the present disclosure.

Referring now to FIG. 5, a block diagram of a networked system 500 configured to facilitate one or more processes in accordance with various embodiments of the present disclosure is illustrated. System 500 includes a user device 502, a user device 504, and an electronic service provider server(s) 506. A user 502A is associated with user device 502, where user 502A can provide an input to service provider server 506 using user device 502. A user 502B is associated with user device 504, where user 502B can provide an input to service provider server 506 using user device 502B.

User device 502, user device 504, and service provider server 506 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 500, and/or accessible over a network 508. Each of the memories may be non-transitory memory. Network 508 may be implemented as a single network or a combination of multiple networks. For example, in various embodiments, network 508 may include the Internet or one or more intranets, landline networks, and/or other appropriate types of networks.

User device 502 may be implemented using any appropriate hardware and software configured for wired and/or wireless communication over network 508. For example, in some embodiments, user device 502 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 502 may include one or more browser applications which may be used, for example, to provide a convenient interface to facilitate responding to recipient account detail requests over network 508. For example, in one embodiment, the browser application may be implemented as a web browser configured to view information available over the internet and respond to requests sent by service provider server 506. User device 502 may also include one or more toolbar applications which may be used, for example, to provide client-side processing for performing desired tasks in response to operations selected by user 502A. In one embodiment, the toolbar application may display a user interface in connection with the browser application.

User device 502 may further include other applications as may be desired in particular embodiments to provide desired features to user device 502. For example, the other applications may include an application to interface between service provider server 506 and the network 508, security applications for implementing client-side security features, programming client applications for interfacing with appropriate application programming interfaces (APIs) over network 508, or other types of applications. In some cases, the APIs may correspond to service provider server 506. The applications may also include email, texting, voice, and instant messaging applications that allow user 502A to send and receive emails, calls, and texts through network 508, as well as applications that enable the user to communicate to service provider server 506. User device 502 includes one or more device identifiers which may be implemented, for example, as operating system registry entries, cookies associated with the browser application, identifiers associated with hardware of user device 502, or other appropriate identifiers, such as those used for user, payment, device, location, and or time authentication. In some embodiments, a device identifier may be used by service provider server 506 to associate user 502A with a particular account maintained by the service provider server 506. A communications application with associated interfaces facilitates communication between user device 502 and other components within system 500. User device 504 may be similar to user device 502.

Service provider server 506 may be maintained, for example, by an online service provider which may provide electronic transaction services. In this regard, service provider server 506 includes one or more applications which may be configured to interact with user device 502 and user device 504 over network 508 to facilitate the electronic transaction services. Service provider server 506 may maintain a plurality of user accounts (e.g., stored in a user account database accessible by service provider server 506), each of which may include account information associated with individual users. Service provider server 506 may perform various functions, including communicating over network 508 with a payment network and/or other network servers capable a transferring funds between financial institutions and other third-party providers to complete transaction requests and process transactions.

Figure 6:
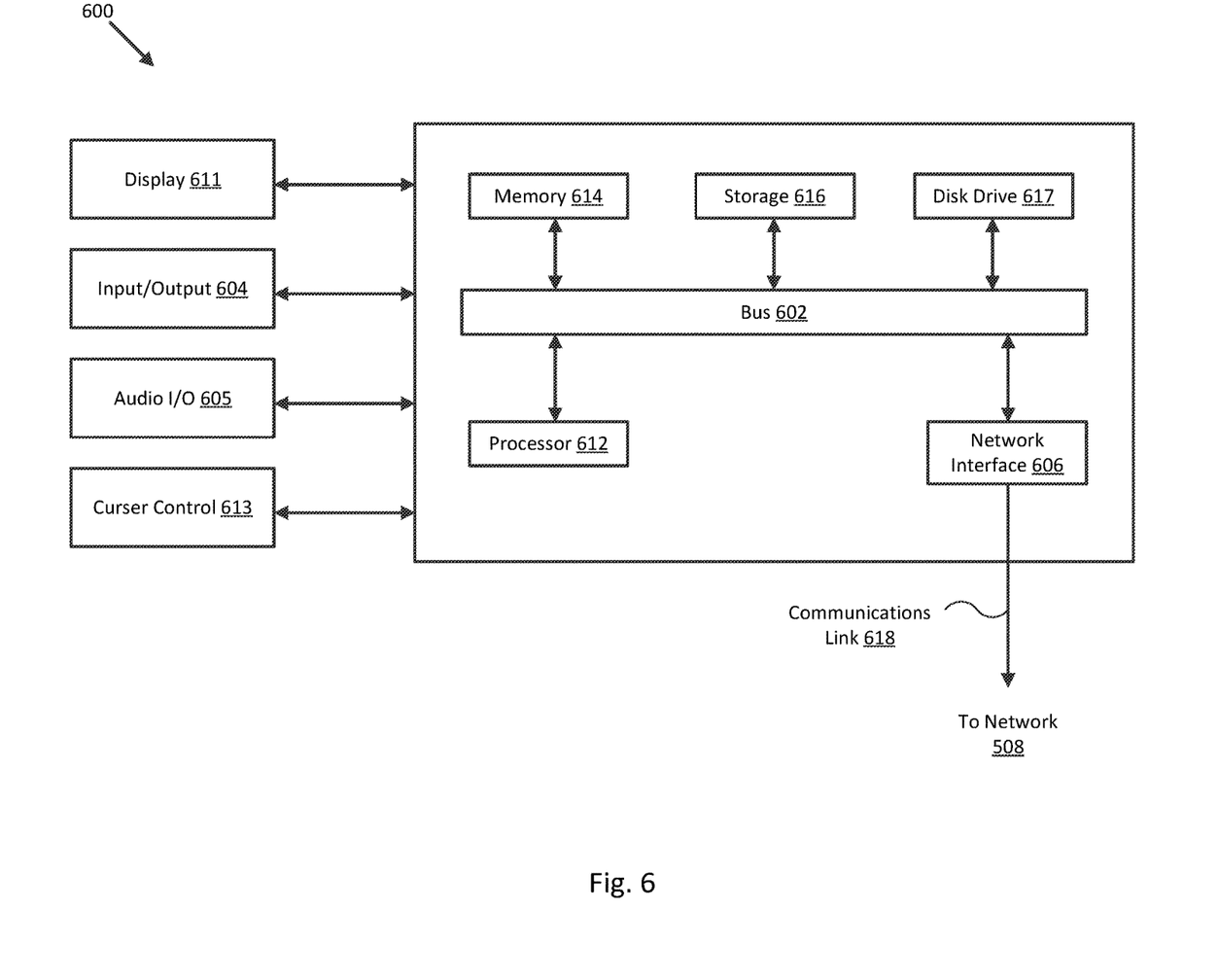
FIG. 6 illustrates a block diagram of a computer system in accordance with one or more embodiments of the present disclosure.

FIG. 6 illustrates a block diagram of a computer system 600 suitable for implementing one or more embodiments of the present disclosure. It should be appreciated that each of the devices utilized by users, entities, and service providers (e.g., computer systems) discussed herein may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities. An optional audio I/O component 605 may also be included to allow a user to use voice for inputting information by converting audio signals. Audio I/O component 605 may allow the user to hear audio. A transceiver or network interface 606 transmits and receives signals between computer system 600 and other devices, such as another user device, an entity server, and/or a provider server via network 508. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network 508 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

What is claimed is:

1. A computer system comprising:
   a non-transitory memory storing instructions; and
   one or more hardware processors configured to read the instructions and cause the computer system to perform operations comprising:
   accessing, as a part of a user account registration with an electronic service provider, an electronic file provided by a user through a user interface for a function provided by the electronic service provider, the function comprising an identity verification function;
   identifying items of information that are contained in the electronic file;
   determining necessary items of information in the electronic file that are needed to perform the function;
   masking unnecessary items of information in the electronic file that are not needed to perform the function;
   presenting a masked electronic file to the user through the user interface, wherein the masked electronic file removes a display of the unnecessary items of information and shows the necessary items of information; and
   sending a request to a user device, the request requesting a user consent to allow the masked electronic file to be stored in a database accessible by the electronic service provider.

2. The computer system of claim 1, wherein the necessary items of information are determined at least in part based on one or more specified rules that apply to the function.

3. The computer system of claim 1, wherein the operations further comprise storing the masked electronic file in the database based on receiving a user acceptance of the request.

4. The computer system of claim 1, wherein the masking the unnecessary items comprises placing a bounding box about the unnecessary items and nulling the bounding box.

5. The computer system of claim 4, wherein the electronic file comprises an audio file, and wherein the nulling the bounding box comprises muting a section of audio bound by the bounding box.

6. The computer system of claim 1, wherein the necessary items of information include a name of the user and a date of birth of the user.

7. The computer system of claim 1, wherein the electronic file comprises an image, and wherein the identifying the items of information comprises:
- performing preprocessing of the image to orient and normalize the image; and
- classifying the image using a multi-label machine learning classifier.

8. A method comprising:
- receiving, as a part of a user identity verification with an electronic service provider, an uploaded image through a user interface for an identity verification function requested by the electronic service provider;
- identifying content contained in the uploaded image;
- determining a first type of content in the uploaded image needed to perform the identity verification function;
- determining which of the identified content matches the first type of content, wherein any of the identified content that does not match the first type of content is a second type of content that is not needed to perform the identity verification function;
- masking the second type of content in the uploaded image;
- presenting a masked image through the user interface, wherein the masked image hides the second type of content in the uploaded image and shows the identified content that matches the first type of content; and
- requesting a user consent to allow the masked image to be stored in a data storage device accessible by the electronic service provider.

9. The method of claim 8, wherein the determining the first type of content is based on a predefined rule for the identity verification function.

10. The method of claim 8, wherein the masking the second type of content includes replacing pixels corresponding to the second type of content with a predefined pixel value.

11. The method of claim 8, wherein the determining the first type of content or the determining which of the identified content matches the first type of content is performed at least in part using a multi-label machine learning classifier.

12. The method of claim 11, further comprising storing the masked image in the data storage device in response to receiving the user consent.

13. The method of claim 8, wherein the identity verification function comprises a documentation verification.

14. The method of claim 8, further comprising receiving a request to activate an account with the electronic service provider, wherein the identity verification function comprises an identity verification of the account.

15. The method of claim 8, wherein the determining which of the identified content matches the first type of content includes performing an optical character recognition on the uploaded image.

16. A non-transitory machine-readable medium having instructions stored thereon, wherein the instructions are executable to cause a machine of a system to perform operations comprising:
- retrieving, as a part of a user verification with an electronic service provider, an image that was submitted by a user through a user interface for an identity verification function;
- identifying items of information that are contained in the image;
- determining that one or more first items of information from the items of information are necessary to perform the identity verification function;
- determining which of the identified items of information matches the one or more first items of information, wherein any of the identified items of information that do not match the one or more first items of information are identified as second items of information that are unnecessary to perform the identity verification function;
- masking the second items of information in the image;
- presenting a masked image to the user through the user interface, wherein the masked image hides the second items of information in the image and shows the identified items of information that match the first items of information; and
- requesting a consent from the user to allow the masked image to be stored in an electronic storage device accessible by the electronic service provider.

17. The non-transitory machine-readable medium of claim 16, wherein the masked image comprises pixels corresponding to the second items of information altered to a non-uniform pattern.

18. The non-transitory machine-readable medium of claim 16, wherein the operations further comprise storing the masked image in the electronic storage device and deleting the retrieved image.

19. The non-transitory machine-readable medium of claim 16, wherein the identifying the items of information that are contained in the image includes performing an optical character recognition process on the image.

20. The non-transitory machine-readable medium of claim 19, wherein the identifying further comprises classifying the image, after the optical character recognition process, using a multi-label classification model.

* * * * *